United States Patent

Bejune et al.

[11] Patent Number: 5,694,719
[45] Date of Patent: Dec. 9, 1997

[54] SNAP-IN SLIP JOINT ADJUSTING ATTACHMENT

[75] Inventors: Daniel Carl Bejune, Southfield; Marcus Edward Merideth, Westland, both of Mich.

[73] Assignee: Ford Motor Company, Dearborn, Mich.

[21] Appl. No.: 552,408

[22] Filed: Nov. 3, 1995

[51] Int. Cl.$^6$ ........................................ B60J 5/04
[52] U.S. Cl. .............................. 49/502; 49/348; 411/182
[58] Field of Search .......................... 49/502, 348, 349, 49/350, 351, 352; 411/182, 268, 269; 403/343, 371, 109

[56] References Cited

U.S. PATENT DOCUMENTS

| | | |
|---|---|---|
| 4,183,178 | 1/1980 | Kiefer et al. . |
| 4,431,092 | 2/1984 | Kloster . |
| 4,608,778 | 9/1986 | Shiraishi et al. ........................ 49/352 |
| 4,759,670 | 7/1988 | Linder et al. ........................ 411/182 X |
| 4,768,907 | 9/1988 | Gauron ................................ 411/182 X |
| 4,890,966 | 1/1990 | Umezawa ........................... 411/182 X |
| 5,092,550 | 3/1992 | Bettini ................................ 411/182 X |
| 5,351,443 | 10/1994 | Kimura et al. . |

FOREIGN PATENT DOCUMENTS

| | | |
|---|---|---|
| 33 04 569 | 7/1984 | Germany . |
| 35 45 856 | 1/1987 | Germany . |
| 3-139425 | 6/1991 | Japan . |
| 4-71924 | 3/1992 | Japan . |
| 2271824 | 4/1994 | United Kingdom . |

*Primary Examiner*—Kenneth J. Dorner
*Assistant Examiner*—Jerry Redman
*Attorney, Agent, or Firm*—Schwartz & Weinrieb

[57] ABSTRACT

A fastener system (210) for adjustably attaching or mounting an automotive vehicle window channel member or guide rail (214) to or upon an automotive vehicle inner door panel (212) so that the automotive vehicle window channel member or guide rail (214) can be disposed at a predetermined position with respect to the automotive vehicle inner door panel (212) includes a nut member (234) mounted upon the inner door panel (212), and a shaft or rod portion (264) of the window channel member or guide rail (214) is inserted through the nut member (234). A tubular fastener screw or bolt (224) is inserted over the shaft or rod portion (264) of the window channel member or guide rail (214) so as to also be inserted within the nut member (234). When the tubular fastener screw or bolt (224) is threadedly engaged with the nut member (234), the tubular fastener screw or bolt (224) is forced to tightly engage the shaft or rod portion (264) of the window channel member or guide rail (214) so as to lockingly retain the window channel member or guide rail (214) at the predetermined position with respect to the automotive vehicle inner door panel (212).

20 Claims, 2 Drawing Sheets

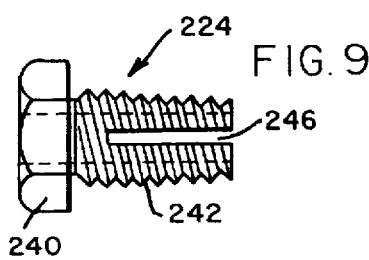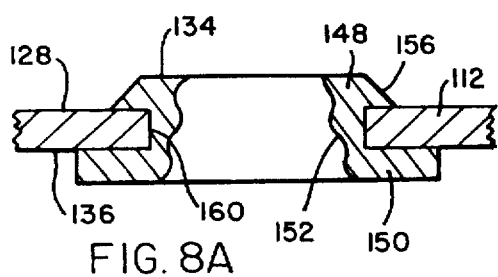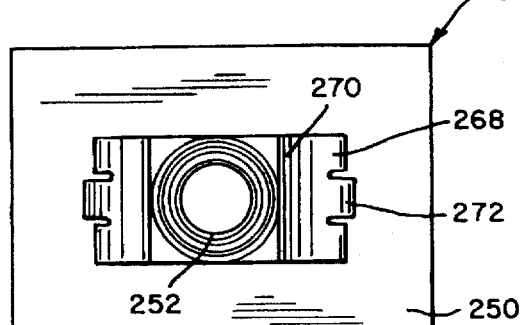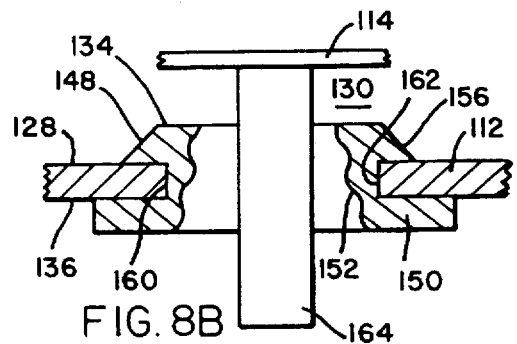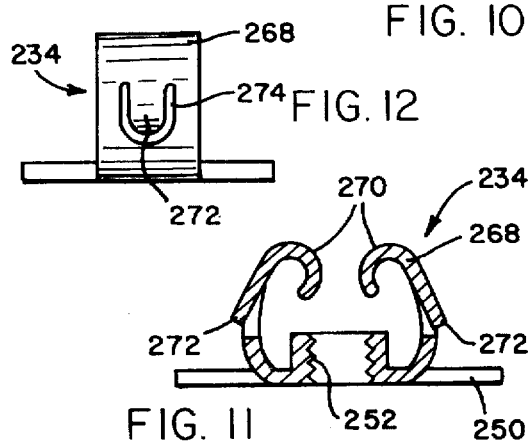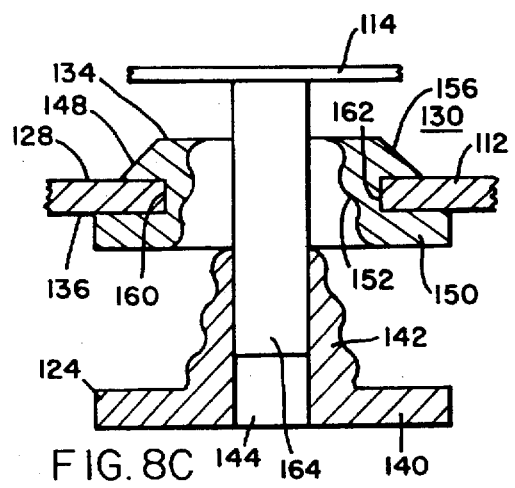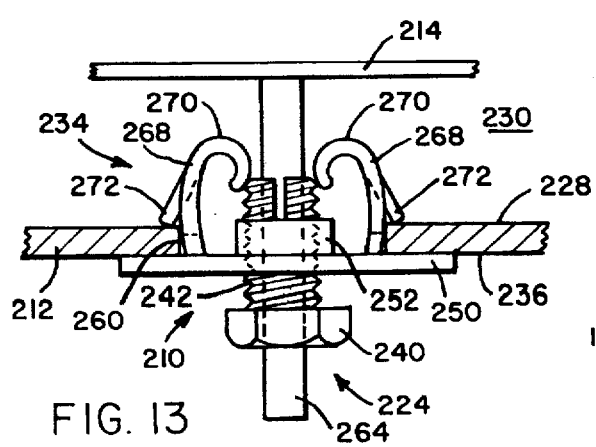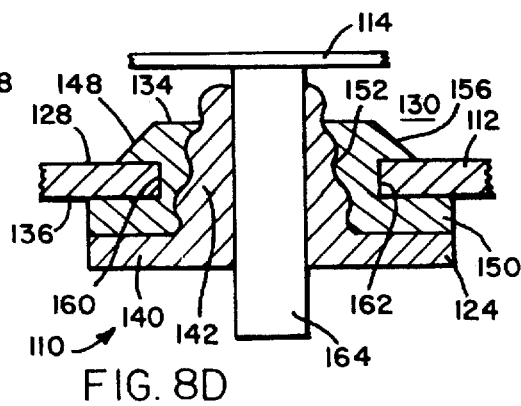

SNAP-IN SLIP JOINT ADJUSTING ATTACHMENT

TECHNICAL FIELD

The present invention relates generally to a fastener system for adjustably attaching or mounting a first structural component to or upon a second structural component, and more particularly to a fastener system for adjustably attaching or mounting an automotive vehicle window guide channel to or upon the automotive vehicle inner door panel.

BACKGROUND ART

Automotive windows which are movably mounted upon the doors of the automotive vehicle are able to raised or lowered relative to the vehicular doors by means of a window pane lifter mechanism. The lifter mechanism comprises a plurality of guide rails or channel members fixedly connected to an inner door panel by adjustable bolt assemblies, a plurality of guide rollers or stud members mounted upon the window by suitable bracket assemblies whereby the guide rollers or stud members are movably disposed within the guide rails or channel menders, and a powered drive mechanism operately connected to the inner door panel and to the window panel so as to move the window panel upwardly or downwardly with respect to the vehicular door as a result of the guide rollers or stud members moving correspondingly along the guide rails or channel members.

After installation of the window assemblies within or upon the vehicular doors, the positional disposition of the window assemblies relative to the vehicular doors must be inspected and adjusted as necessary in order to ensure the fact that the window panels are properly seated upon or within the door assemblies so that the window panels will accurately or properly mate with or engage window frame components, weather stripping, or other vehicle seal elements so as to eliminate any excessive wind noise, water leakage, and the like. Such window assembly adjustments are normally accomplished by adjustment of the aforenoted adjustable bolt assemblies, however, such adjustments are often inaccurate, relatively difficult or cumbersome to perform, and are quite time-consuming.

The aforenoted adjustment problems characteristic of conventional vehicular door-mounted window assemblies can be appreciated from FIG. 1 of the patent application drawings in which a conventional, bolt-adjustment assembly, utilized in connection with the positional adjustment of the window panel channel member or guide rail with respect to the inner door panel of the vehicle, is illustrated. More particularly, the bolt-adjustment assembly is generally indicated by the reference character 10. The inner door panel of the vehicle is illustrated at 12, the window glass or panel channel member or guide rail is shown at 14, and it is understood that the bolt-adjustment assembly serves to positionally adjust the disposition of the window glass or panel channel member or guide rail 14 relative to the vehicle inner door panel 12 in an inboard/outboard manner as schematically indicated by means of arrow A. The channel member or guide rail 14 has a substantially U-shaped cross-sectional configuration which is adapted to house or accommodate a guide roller or stud member, not shown, fixedly mounted upon the window panel or pane by means of suitable bracket assemblies, also not shown, and an adjustment screw or bolt mounting bracket 16, having a substantially trapezoidal cross-sectional configuration, is fixedly secured to the channel member or guide rail 14 by means of laterally outwardly extending flange portions 18 which are welded to the channel member or guide rail 14 as at 20. A central portion of the bolt mounting bracket 16 is provided with a nut 22 which is fixedly mounted upon bracket 16 by means of, for example, welds, not shown, and a threaded adjustment screw or bolt 24 has an outer axial end thereof threadedly engaged within the nut 22. A flange member 26 is integrally provided upon the adjustment screw or bolt 24 so as to be disposed within the vicinity of or adjacent to the inner axial end of the adjustment bolt or screw 24, as considered relative to the inner door panel 12. The flange member 26 is adapted to be maintained in abutment contact with the surface 28 of the inner door panel 12, which faces the door cavity 30 defined between the inner door panel 12 and the outer door panel, not shown, during the window panel adjustment procedure. In this manner, an adjustment reference plane is effectively defined between the flange member 26 and the inner door panel 12 relative to which the window panel channel member or guide rail 14 may be adjusted as desired or required. The inner axial end of the adjustment bolt or screw 24 is further provided with a recessed socket portion 32 defined within the inner axial end face of the bolt or screw 24, and a nut 34 is threadedly engaged upon the inner axial end of the bolt or screw 24 so as to engage the opposite surface 36 of the inner door panel 12.

In order to achieve positional adjustment of the channel member or guide rail 14, and therefore, in turn, the positional inboard/outboard adjustment of the vehicular window panel or pane, relative to the inner door panel 12 and with respect to an initially assembled disposition as illustrated in FIG. 1, nut 34 is firstly removed from the inner axial end of the bolt or screw 24. Subsequently, a suitable tool, not shown, is inserted into the recessed socket portion 32 of the bolt or screw 24 and, while the flange member 26 is maintained in abutment contact with the surface 28 of the inner door panel 12, the bolt or screw 24 is accordingly rotated in either a clockwise or counterclockwise direction so as to threadedly rotate the outer axial end of the bolt or screw 24 which is threadedly engaged within the mounting bracket nut 22. This relative rotation defined between the outer axial end of the bolt or screw 24 and the mounting bracket nut 22 serves to move the mounting bracket 16 and its attached window panel channel member or guide rail 14 in either an inboard or outboard direction so as to, in turn, positionally move the window panel in either an inboard direction or an outboard direction with respect to the inner door panel 12. When an anticipated or estimated positional adjustment of the window panel channel member or guide rail 14 has been made, and with the flange member 26 maintained in abutment contact with the surface 28 of the inner door panel 12, nut 34 is again threadedly engaged upon the inner axial end of the bolt or screw 24 until it tightly engages the opposite surface 36 of the inner door panel 12.

While the aforenoted adjustment system appears to be relatively simple whereby the adjustment procedure can be readily, easily, and accurately performed, in practice the system has in fact proven to be cumbersome, difficult to perform, and not especially accurate whereby multiple adjustments, basically being performed upon a trial-and-error basis, have been required in order to achieve acceptable positioning or location of the window panel channel member or guide rail 14. Due to the need for such multiple positional adjustments, the adjustment procedure has proven to be quite time-consuming and tedious. One major difficulty encountered during the positional adjustment procedure is that it has proven difficult to maintain the flange member 26 in abutment contact with the surface 28 of the inner door panel 12 while rotational adjustment of the adjustment bolt or screw 24 is being performed. This can be readily appreciated when consideration is given to the different forces acting upon the single structural member or component, that is, the adjustment screw or bolt 24. A first suitable positioning force, acting in the direction of arrow B, must be impressed upon the screw or bolt 24, either manually or by means of a suitable adjustment fixture, not shown, so as to maintain the flange member 26, which is integral with adjustment bolt or screw 24, in abutment contact with the surface 28 of the inner door panel 12. On the other hand, a second oppositely directed force, as denoted by the arrow C, is impressed upon the adjustment screw or bolt 24 by means of the suitable tool, such as, for example, a screwdriver, socket wrench, or the like, which is drivingly inserted within the recessed socket portion 32 of the adjustment screw or bolt 24. Consequently, it is not always possible, or alternatively, it is sometimes difficult, to maintain the flange portion or member 26 of the adjustment screw or bolt 24 engaged with the surface 28 of the inner door panel 12 while the rotational adjustment of the adjustment screw or bolt 24 is being performed. If the flange portion or member 26 of the adjustment screw or bolt 24 is not maintained in abutment contact with the surface 28 of the inner door panel 12, then the positional adjustment of the mounting bracket 16 and the channel member or guide rail 14 will not be accurately achieved thereby necessitating multiple readjustments upon a trial-and-error basis. Such multiple readjustments, however, are not acceptable, and more importantly, are not possible in view of the fact that automotive vehicles are produced in accordance with mass-production techniques which are limited or defined by assembly-line constraints.

A need therefore exists for a fastener system for adjustably attaching or mounting an automotive vehicle window channel member or guide rail upon an automotive vehicle inner door panel which can readily achieve positional adjustment of the channel member or guide rail without requiring multiple adjustments of the member or guide rail upon a time-consuming trial-and-error basis.

DISCLOSURE OF THE INVENTION

Accordingly, it is an object of the present invention to provide a new and improved fastener system for adjustably attaching or mounting a first structural component to or upon a second structural component.

Another object of the present invention is to provide a new and improved fastener system for adjustably attaching or mounting an automotive vehicle window channel member or guide rail to or upon an automotive vehicle inner door panel.

Yet another object of the present invention is to provide a new and improved fastener system for adjustably attaching or mounting an automotive vehicle window channel member or guide rail to or upon an automotive vehicle inner door panel which overcomes the various drawbacks characteristic of the prior art or conventional systems.

Still another object of the present invention is to provide a new and improved fastener system for adjustably attaching or mounting an automotive vehicle window channel member or guide rail to or upon an automotive vehicle inner door panel which can facilitate the reliable and accurate adjustment of the vehicle window channel member or guide rail to or upon the automotive vehicle inner door panel.

An additional object of the present invention is to provide a new and improved fastener system for adjustably attaching or mounting an automotive vehicle window channel member or guide rail to or upon an automotive vehicle inner door panel which can enable the reliable and accurate adjustment of the vehicle window channel member or guide rail to or upon the automotive vehicle inner door panel whereby repetitive, multiple adjustments of the vehicle window channel member or guide rail with respect to the automotive vehicle inner door panel, on a trial-and-error basis, are effectively obviated.

A further object of the present invention is to provide a new and improved fastener system for adjustably attaching or mounting an automotive vehicle window channel member or guide rail to or upon an automotive vehicle inner door panel which can enable the reliable and accurate adjustment of the vehicle window channel member or guide rail to or upon the automotive vehicle inner door panel in a relatively simply and rapid manner whereby repetitive, multiple adjustments of the vehicle window channel member or guide rail with respect to the automotive vehicle inner door panel are obviated such that the adjustment procedures are not excessively time-consuming.

A still further object of the present invention is to provide a new and improved fastener system for adjustably attaching or mounting an automotive vehicle window channel member or guide rail to or upon an automotive vehicle inner door panel which facilitates the reliable and accurate adjustment of the vehicle window channel member or guide rail to or upon the automotive vehicle inner door panel whereby time-consuming repetitive, multiple readjustments of the vehicle window channel member or guide rail with respect to the automotive vehicle inner door panel are able to be effectively eliminated such that the adjustment procedures can be accurately and properly achieved in accordance with assembly-line constraints incorporated within mass-production operations.

The foregoing and other objectives are achieved in accordance with the present invention through the provision of a fastener system which comprises a nut member which is adapted to be snap-fitted onto the inner door panel, and a hollow or tubular threaded bolt or screw. In accordance with a first embodiment of the invention, the nut member is axially split at a single peripheral portion thereof so as to enable the same to be snap-fitted through an aperture defined within the inner door panel, and the nut member comprises axially separated flange portions for engaging opposite surfaces of the inner door panel when the nut member is snap-fitted onto the inner door panel. The tubular bolt or screw has an axial bore defined therethrough for accommodating a shaft or rod portion of the vehicle window channel member or guide rail, and the outer periphery of the shank portion of the bolt or screw is tapered radially inwardly in the direction extending from the head portion of the bolt or screw to the free distal end of the shank portion so as to have a substantially frusto-conical configuration. The inner periphery of the nut member has a similar tapered or convergent structure, and the outer periphery of the bolt or screw shank portion, as well as the inner periphery of the nut member, are both provided with tapered threads or pipe threads. The shank portion of the bolt or screw is also axially split, and consequently, when the shaft or rod portion of the vehicle window channel member or guide rail is axially inserted to a desired position with respect to the inner door panel, the nut member snap-fitted onto the inner door panel, and the tubular bolt or screw which may be partially threadedly engaged within the nut member, the tubular bolt or screw is fully tightened or threadedly engaged with the nut member causing the latter to expand radially outwardly in order to tightly grasp or engage the opposite surfaces of the inner door panel, while at the same time, the tapered or convergent inner and outer peripheral structures of the nut member and the tubular bolt or screw, respectively, cause the tubular bolt or screw to contract radially inwardly thereby tightly grasping or engaging the rod or shaft portion of the vehicle window channel member or guide rail so as to fixedly position the vehicle window channel member or guide rail with respect to the inner door panel.

In accordance with a second embodiment of the present invention, the fastener system comprises substantially the same structural components, however, the particular structure of the nut member differs from the structure of the nut member of the first embodiment. More particularly, in lieu of the first and second flange portions, the nut member of the second embodiment comprises only one flange portion for engaging a first surface of the inner door panel, and a pair of flexible axially extending fingers are integrally formed upon the flange portion so as to be disposed upon opposite sides of a central nut portion. Each of the fingers includes a substantially U-shaped detent which is adapted to snap-fittingly engage the opposite surface of the inner door panel when the fingers are inserted through the aperture of the inner door panel, and when the tubular bolt or screw is threadedly engaged within the central nut portion of the nut member, the free distal end of the shank portion of the tubular bolt or screw engages free distal end portions of the flexible fingers thereby tending to expand the latter radially outwardly so as to, in turn, cause the detent portions thereof to further or more tightly engage the opposite surface of the inner door panel. At the same time, the threaded engagement defined between the central nut portion of the nut member and the threaded shank portion of the tubular bolt or screw, and in particular, due to the tapered peripheral surface portions thereof, causes the tubular bolt or screw to be contracted radially inwardly so as to tightly grasp or engage the rod or shaft portion of the vehicle window channel member or guide rail thereby fixedly or lockingly positioning the vehicle window channel member or guide rail with respect to the inner door panel.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 8A through 8D are schematic, cross-sectional views illustrating the first embodiment of the fastener assembly of the present invention as employed for adjusting the disposition of the automotive vehicle window channel member or guide rail with respect to the automotive vehicle inner door panel;

FIG. 9 is a side elevation view, similar to that of FIG. 3, showing, however, a tubular bolt or screw fastener which is to be used within a second embodiment of a fastener system of the present invention for adjustably attaching or mounting an automotive vehicle window channel member or guide rail to or upon an automotive vehicle inner door panel;

FIG. 10 is a top plan view, similar to that of FIG. 5, showing, however, a nut member which is to be used in conjunction with the tubular bolt or screw fastener of FIG. 9 within the second embodiment of the fastener system of the present invention;

FIG. 11 is a side elevation view of the nut member of FIG. 10;

FIG. 12 is an end elevation view of the nut member of FIG. 10; and

FIG. 13 is a view, similar to that of FIG. 8D, showing, however, the assembly of the fastener system of the second embodiment of the present invention and its operational use in connection with the positional adjustment of the automotive vehicle window channel member or guide rail with respect to the automotive vehicle inner door panel.

MODES FOR CARRYING OUT THE INVENTION

Figure 1:
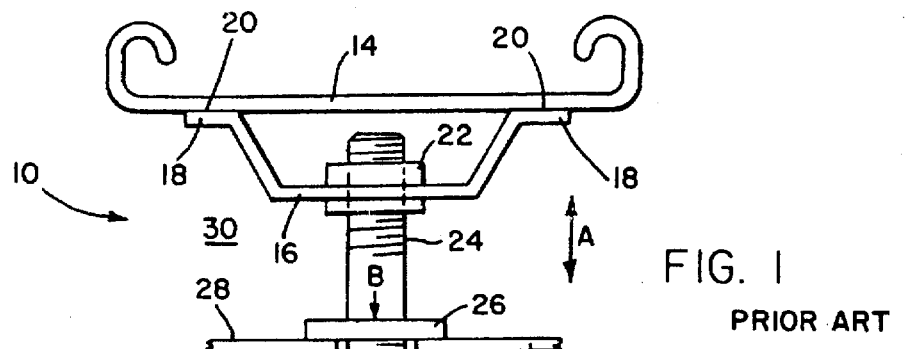
FIG. 1 is a cross-sectional view of a PRIOR ART fastener system for adjustably attaching or mounting an automotive vehicle window channel member to or upon an automotive inner door panel.

Referring now to the drawings, and more particularly to FIGS. 2 through 8D, a first embodiment of a fastener system for adjustably attaching or mounting an automotive vehicle window channel member or guide rail to or upon an automotive vehicle inner door panel, and constructed in accordance with the principles of the present invention, is generally indicated by the reference character 110. The inner door panel is designated in FIG. 8D by the reference character 112, and the window channel member or guide rail, to be positionally adjusted with respect to the inner door panel 112, is designated by the reference character 114, the channel member or guide rail 114 being disposed within the door cavity 130 defined between the inner door panel 112 and an outer door panel, not shown. In accordance with this first embodiment of the fastener system of the present invention, there is provided a tubular threaded bolt or screw 124 and a nut member 134.

Figure 2:
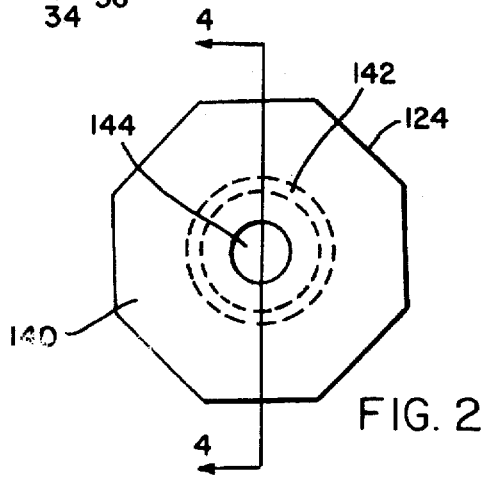
FIG. 2 is a top plan view of a tubular bolt or screw fastener utilized within a first embodiment of a fastener system of the present invention for adjustably attaching or mounting an automotive vehicle window channel member to or upon an automotive inner door panel.
Figure 3:
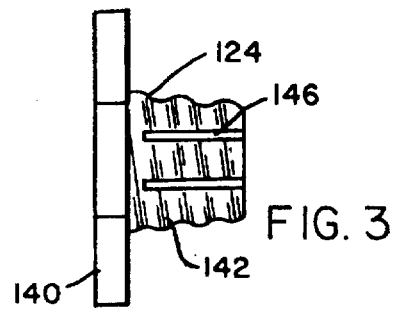
FIG. 3 is a side elevation view of the tubular bolt or screw fastener of FIG. 2.
Figure 4:
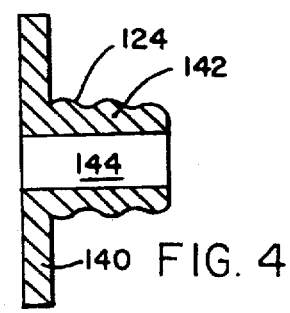
FIG. 4 is a cross-sectional view of the tubular bolt or screw fastener of FIG. 2 as taken along the lines 4—4 of FIG. 2.

The threaded bolt or screw member 124 is more particularly disclosed in FIGS. 2-4 and is seen to comprise a an octagonally shaped head portion 140 and a tubular shank portion 142, with an axial bore 144 extending through both the head portion 140 and the shank portion 142. The exterior periphery of the shank portion 142 is provided with tapered threads or pipe threads, and the diametrical extent of the shank portion 142 is progressively reduced as one proceeds in the direction extending from the head portion 140 to the free distal end of the shank portion 142 such that the outer periphery of the shank portion 142 is tapered and the cross-sectional configuration of the shank portion 142 is substantially frusto-conical. A plurality of axial slits 146 are also defined within the shank portion 142 of the screw or bolt fastener 124 so as to provide a predetermined amount of radial flexibility to the wall sections of the shank portion 142 for a purpose to be discussed more fully hereinafter. As best seen in FIG. 3, the slits 146 extend from the free distal end of the shank portion 142 toward the head portion 140 of the screw or bolt fastener 124, but the axial extent of the slits 146 is terminated prior to reaching the head portion 140.

Figure 6:
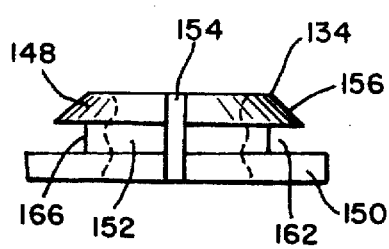
FIG. 6 is a cross-sectional view of the nut member of FIG. 5 as taken along the lines 6—6 of FIG. 5.
Figure 5:
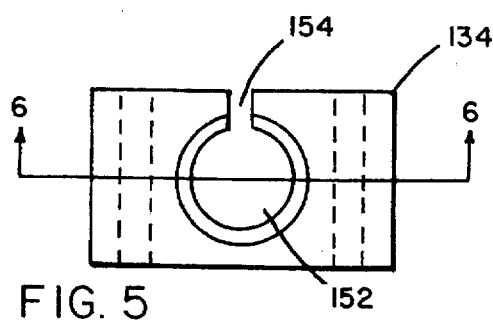
FIG. 5 is a top plan view of a nut member utilized in conjunction with the tubular bolt or screw fastener of FIG. 2 and within the first embodiment of the fastener system of the present invention.
Figure 7:
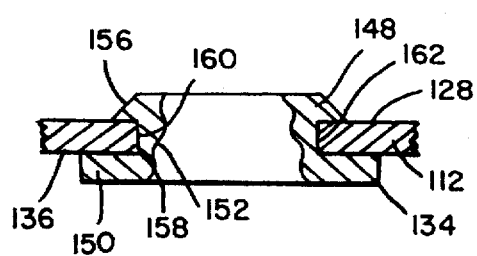
FIG. 7 is a cross-sectional view of the nut member of FIG. 6 as snap-fittingly mounted within or upon the automotive inner door panel.

As best seen in FIGS. 5–7, the nut member 134 comprises two axially spaced flange portions 148 and 150 which are adapted to be engaged with the opposite surfaces 128 and 136 of the inner door panel 112, respectively, as best seen in FIG. 7. The nut member 134 further comprises a central bore 152 which extends the entire axial length of the nut member 134 and through both of the flange portions 148 and 150, and a peripheral portion of the nut member 134 is provided with a radially extending slit 154 which extends radially inwardly from a peripheral edge portion of the nut member 134 to the central through-bore 152 thereof. In this manner, a predetermined amount of radial flexibility is imparted to the nut member 134 for a reason which will be discussed shortly. It is additionally noted that the interior periphery of the through-bore 152 is provided with tapered threads or pipe threads which are complementary with respect to the tapered or pipe threads of the shank portion 142 of the screw or bolt fastener 124, and as best appreciated from FIG. 7, the bore 152 of nut member 134 is radially tapered or convergent as one proceeds in the axial direction extending from the flange portion 150 to the flange portion 148 such that the tapered or convergent configuration of the bore 152 is likewise complementary to the external frusto-conical configuration of the shank portion 142 of the screw or bolt fastener 124. The external periphery of the flange portion 148 is chamfered as at 156 so as to facilitate the snap-fitting engagement of the nut member 134 onto the inner door panel 112 as best seen in FIG. 7. More particularly, when the nut member 134 is desired to be snap-fitted onto the inner door panel 112, the chamfered section 156 of the flange portion 148 is initially moved into contact with the surface 136 of the inner door panel such that the chamfered section 156 actually contacts an annular edge portion 158 of the inner door panel 112 which defines a through-bore 160 within which the nut member 134 will be seated when mounted upon the inner door panel 112. When the nut member 134 is subsequently moved axially toward the opposite side 128 of the inner door panel 112, the engagement of the chamfered peripheral portion 148 of the nut member 134 with the annular edge portion 158 of the through-bore 160 will force the nut member 134 to be radially compressed, as permitted by the radial slit 154, and when the flange portion 148 of the nut member 134 clears or is fully inserted through the inner door panel 112, the flange portion 148 will again expand radially outwardly so as to engage the surface 136 of the inner door panel 112. The inner door panel 112 will then be disposed within the annular space 162 defined between the flange portions 148 and 150 of the nut member 134.

Considering now the use of the fastener system of the present invention as disclosed within FIGS. 2–7 in connection with the adjustable attachment or mounting of an automotive vehicle window channel member or guide rail 114 to or upon the inner door panel 112 of a vehicle, reference is particularly made to FIGS. 8A through 8D. The attachment or mounting procedure begins with the mounting or attachment of the nut member 134 upon or to the inner door panel 112 as illustrated in FIG. 8A which is essentially similar to FIG. 7. The vehicle window channel member or guide rail 114 is illustrated in FIG. 8B and is seen to include an integral rod or shaft member 164 which is adapted to be positionally inserted through the through-bore 152 of the nut member 134 to a desired position with respect to the inner door panel 112. As then appreciated from FIG. 8C, the threaded bolt or screw fastener 124 is then positioned with respect to the rod or shaft portion or member 164 of the channel member or guide rail 114 such that the rod or shaft member 164 is inserted into and through the axial bore 144 of the fastener 124, and subsequently thereto or substantially simultaneously therewith, the shank portion 142 of the fastener 124 is inserted into the through-bore 152 of the nut member 134 as can also be appreciated from FIG. 8D. As the tapered outer periphery of the shank portion 142 of the threaded bolt or screw fastener 124 is progressively threadedly engaged with the inner threaded periphery of the nut member 134, the nut member 134 is radially expanded to a predetermined degree as permitted by means of the radial slit 154 such that the flange portions 148 and 150, as well as the axially extending annular wall portion 166 thereof defining the annular space 162, respectively tightly engage the surfaces 128 and 136, and the annular sidewall defining the through-bore 160, of the inner door panel 112. In addition, the shank portion 142 of the threaded bolt or screw fastener 124 is compressed radially inwardly as permitted by means of the slits 146 so as to tightly engage the outer peripheral surface of the rod or shaft portion 164 of the vehicle window channel member or guide rail 114. In this manner, by pre-disposing the vehicle window channel member or guide rail 114, and more particularly, the rod or shaft portion or member 164 thereof, at a predeterminedly desired or required position with respect to the vehicle inner door panel 112, and by holding or maintaining the channel member or guide rail 114 at such predetermined position, either manually by means of an operator or mechanically by means of a suitable fixture, not shown, the vehicle window channel member or guide rail 114 may be easily and readily lockingly fixed at such position by simply threadedly engaging the bolt or screw fastener 124 with the nut member 134 whereupon the rod or shaft portion 164 of the window channel member or guide rail 114, the bolt or screw fastener 124, the nut member 134, and the inner door panel 112 are all tightly, fixedly, and non-movably secured with respect to each other.

Considering now a second embodiment of the present invention, and with reference being made to FIGS. 9–13, the threaded bolt or screw fastener of this embodiment is disclosed in FIG. 9, is generally indicated by the reference character 224, and is seen to comprise a hexagonal head portion 240, an axially tapered threaded shank portion 242, and a plurality of axially extending slits 246 defined within the shank portion 242. The number of slits 246 may vary, but preferably, the shank portion 242 is provided with four slits equiangularly spaced about the longitudinal axis of the fastener 224.

With reference being made to FIGS. 10–12, it is appreciated that the nut member, generally indicated by the reference character 234, is substantially different from the nut member 134 of the first embodiment of the invention. More particularly, the nut member 234 comprises a flange portion 250 for engaging the surface 236 of the vehicle inner door panel 236, however, in lieu of the other flange portion 148 of the nut member of the first embodiment, this nut member 234 comprises a pair of upstanding flexible fingers 268 disposed upon opposite sides of a central nut portion 252. The lower or proximal ends of the flexible fingers 268 are fixedly or integrally attached to the flange portion 250, and the upper or distal ends of the flexible fingers 268 are provided with substantially inverted U-shaped portions 270. As best seen from FIG. 12, sidewall portions of the flexible fingers 268 further comprise substantially U-shaped cut-out portions or slots which serve to define outwardly projecting detents 272, the slots being shown at 274.

Referring then lastly to FIG. 13 of the drawings wherein the attachment assembly of the fastener system 210 of the present invention is illustrated, it can be appreciated that in a manner similar to the assembly or system 110 of the first embodiment of the invention as illustrated in FIG. 8D, the nut member 234 is initially mounted upon or snap-fitted into the inner door panel 212 by inserting the upstanding finger members 268 through the aperture or throughbore 260 defined within the inner door panel 212. Due to the generally radially inclined disposition of the fingers 268, and the flexibility thereof, the fingers 268 readily deflect radially inwardly when encountering the annular sidewall of the inner door panel which defines the through-bore 260 thereof, and when the nut member 234 is fully inserted within the panel 112 such that the flange portion 250 is disposed in surface contact with the surface 236 of the inner door panel 212, the fingers 268 will regain their initial, non-deflected positions whereupon the detents 272 will also snap-fittingly engage the surface 228 of the inner door panel 112 thereby serving to secure the nut member 234 upon the inner door panel 212. The shaft or rod portion 264 of the vehicle window channel member or guide rail 214 is then axially inserted between the fingers 268 and through the central nut portion 252 of the nut member 234, positionally disposed at a predetermined position with respect to the inner door panel 212, and while being so held at such position either manually by means of an operator, or by means of a suitable fixture, not shown, the threaded bolt or screw fastener 224 is inserted over the shaft or rod portion 264 of the channel member or guide rail 214 and into the central nut portion 252 of the nut member 234. Axial threaded engagement between the threaded bolt or screw fastener 224 and the central nut portion 252 of the nut member 234 permits the free distal end of the bolt or screw fastener 224 to project axially beyond the central nut portion 252 and thereby engage the oppositely disposed fingers 268 so as to cause the latter to be expanded radially outwardly. As a result of such radially outward expansion of the fingers 268, the detents 272 thereof are forced into tighter engagement with the surface 228 of the inner door panel 212 so as to tightly maintain the nut member 234 secured upon the panel 212. At the same time, due to the threaded engagement of the split shank portion 242 of the fastener 224 with the central nut portion 252 of the nut member 234, the split shank portion 242 of the fastener 224 will be contracted radially inwardly so as to fixedly and tightly engage the shaft or rod portion 264 of the vehicle window channel member or guide rail 214. The window channel member or guide rail 214, through means of its rod or shaft portion 264, and the bolt or screw fastener 224, the nut member 234, and the inner door panel 212 are thus tightly and fixedly engaged with each other whereby the vehicle window channel member or guide rail 214 is simply and readily adjustably positioned with respect to the inner door panel 212.

INDUSTRIAL APPLICABILITY

In accordance with the foregoing, it may thus be seen that the present invention has industrial applicability in connection with automotive vehicles. More particularly, the present invention is particularly adapted or directed toward a fastener system for adjustably attaching or mounting an automotive vehicle window channel member or guide rail to or upon an automotive vehicle inner door panel in a relatively simple, quick, reliable, and accurate manner. The structural composition of the fastener system from a minimal number of component parts, as well as the direct connection of the various component parts with respect to each other without the intervention or incorporation within the system of oppositely directed forces impressed upon the component parts during the assembly operation, permits the objectives of the present invention, as noted hereinbefore, to be achieved. It is additionally noted that while the foregoing disclosure has been particularly directed or oriented toward use of the fastener system of the present invention for adjustably attaching or mounting an automotive vehicle window channel member or guide rail to or upon an automotive vehicle inner door panel, the fastener system can likewise be utilized in connection with vertically movable quarter-windows conventionally mounted upon the vehicle's rear quarter-panels within two-door hardtop or convertible vehicles. Still further, while the disclosure has been discussed in connection with those door panel window assemblies which may employ powered drive mechanism components within the window pane lifter mechanism, the present invention can also of course be utilized in connection with a manually operated window pane lifter mechanism.

Obviously, many modifications and variations of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A fastener system adjustably mounting and attaching a first structural component upon and to a second structural component, comprising:

said first structural component having an aperture defined therein;

a nut member having a threaded through-bore defined therein and having a portion thereof extending through said aperture of said first structural component so as to be mounted upon said first structural component;

said second structural component having a portion thereof extending through said threaded through-bore of said nut member; and a tubular threaded screw member, having a bore defined therein for accommodating said portion of said second structural component, inserted into said threaded through-bore of said nut member for threadedly engaging said threaded through-bore of said nut member so as to fixedly grasp and retain said second structural component at a desired position with respect to said first structural component, depending upon the extent to which said portion of said second structural component is inserted into said through-bore of said nut member, as said tubular threaded screw member is threadedly engaged with said nut member.

2. A system as set forth in claim 1, wherein:

said first structural component comprises an automotive vehicle inner door panel; and said second structural component comprises an automotive vehicle window channel member.

3. A system as set forth in claim 1, wherein:

said through-bore of said nut member has a tapered configuration extending in an axial direction so as to cause radial contraction of said tubular threaded screw member as said tubular threaded screw member is threadedly engaged with said nut member whereby said tubular threaded screw member is able to tightly engage said second structural component.

4. A system as set forth in claim 3, wherein:

said tubular threaded screw member comprises a split shank portion permitting said radial contraction to occur as said tubular threaded screw member is threadedly engaged within said nut member.

5. A fastener system as set forth in claim 4, wherein:

said split shank portion of said tubular threaded screw member is axially tapered so as to have a substantially frusto-conical cross-sectional configuration.

6. A system as set forth in claim 1, wherein:

said nut member comprises axially spaced flange portions for engaging opposite surfaces of said first structural component when said nut member is mounted upon said first structural component.

7. A system as set forth in claim 6, wherein:

said nut member is axially split at a peripheral portion thereof by means of a slit extending radially inwardly from a peripheral edge portion of said nut member to said through-bore so as to permit said nut member to radially contracted and expanded when said nut member is snap-fittingly mounted upon said first structural component.

8. A system as set forth in claim 1, wherein:

said nut member comprises a flange portion for engaging a first surface of said first structural component when said nut member is mounted upon said first structural component, and detent means for engaging a second opposite surface of said first structural component when said nut member is mounted upon said first structural component.

9. A system as set forth in claim 8, wherein said nut member comprises:

a central nut portion for threadedly engaging said threaded screw member; and a pair of flexible fingers, disposed upon opposite sides of said central nut portion and having said detent means mounted thereon, for engaging a free distal end portion of said threaded screw member as said threaded screw member is threadedly engaged within said central nut portion whereby said pair of flexible fingers are deflected radially outwardly by said free distal end portion of said threaded screw member so as to force said detent means into tight engagement with said second opposite surface of said first structural component.

10. A system as set forth in claim 9, wherein:

said detent means comprise radially outward projections formed by substantially U-shaped cut-out portions defined within sidewalls of said flexible fingers.

11. A fastener system adjustably attaching and mounting an automotive vehicle window channel member upon and to an automotive vehicle inner door panel so that said automotive vehicle window channel member will be disposed at a desired position with respect to said automotive vehicle inner door panel, comprising:

said automotive vehicle inner door panel having an aperture defined therein;

a nut member having a threaded through-bore defined therein and having a portion thereof extending through said aperture of said automotive vehicle inner door panel so as to be mounted upon said automotive vehicle inner door panel;

said automotive vehicle window channel member having a shaft portion thereof extending through said threaded through-bore of said nut member; and a tubular threaded screw member, having a bore defined therein for accommodating said shaft portion of said automotive vehicle window channel member such that said tubular threaded screw member surrounds said shaft portion of said automotive vehicle window channel member, inserted into said threaded through-bore of said nut member for threadedly engaging said threaded through-bore of said nut member so as to fixedly grasp and retain said shaft portion of said automotive vehicle window channel member at a desired position with respect to said automotive vehicle inner door panel, depending upon the extent to which said shaft portion of said automotive vehicle window channel member is inserted into said through-bore of said nut member, as said tubular threaded screw member is threadedly engaged with said nut member.

12. A fastener system as set forth in claim 11, wherein:

said through-bore of said nut member has a tapered configuration extending in an axial direction so as to cause radial contraction of said tubular threaded screw member as said tubular threaded screw member is threadedly engaged with said nut member whereby said tubular threaded screw member is able to tightly engage said shaft portion of said automotive vehicle window channel member.

13. A fastener system as set forth in claim 12, wherein:

said tubular threaded screw member comprises a split shank portion permitting said radial contraction of said tubular threaded screw member to occur as said tubular threaded screw member is threadedly engaged within said nut member.

14. A fastener system as set forth in claim 13, wherein:

said split shank portion of said tubular threaded screw member is axially tapered so as to have a substantially frusto-conical cross-sectional configuration.

15. A fastener system as set forth in claim 11, wherein:

said nut member comprises axially spaced flange portions for engaging opposite surfaces of said automotive vehicle inner door panel when said nut member is mounted upon said automotive vehicle inner door panel.

16. A fastener system as set forth in claim 15, wherein:

said nut member is axially split at a peripheral portion thereof by means of a slit extending radially inwardly from a peripheral edge portion of said nut member to said through-bore of said nut member so as to permit said nut member to radially contract and expand and thereby be snap-fittingly mounted upon said automotive vehicle inner door panel.

17. A fastener system as set forth in claim 11, wherein:

said nut member comprises a flange portion for engaging a first surface of said automotive vehicle inner door panel when said nut member is mounted upon said automotive vehicle inner door panel, and detent means for engaging a second opposite surface of said automotive vehicle inner door panel when said nut member is mounted upon said automotive vehicle inner door panel.

18. A fastener system as set forth in claim 17, wherein said nut member comprises:

a central nut portion for threadedly engaging said threaded screw member; and a pair of flexible fingers, disposed upon opposite sides of said central nut portion and having said detent means mounted thereon, for engaging a free distal end portion of said threaded screw member as said threaded screw member is threadedly engaged within said central nut portion whereby said pair of flexible fingers are deflected radially outwardly by said free distal end portion of said threaded screw member so as to force said detent means into tight engagement with said second opposite surface of said automotive vehicle inner door panel.

19. A system as set forth in claim 18, wherein:

said detent means comprise radially outward projections formed by substantially U-shaped cut-out portions defined within sidewalls of said flexible fingers.

20. A fastener system adjustably mounting and attaching an automotive vehicle window channel member upon and to an automotive vehicle inner door panel so that said automotive vehicle window channel member will be disposed at a desired position with respect to said automotive vehicle inner door panel, comprising:

said automotive vehicle inner door panel having an aperture defined therein;

a nut member having a threaded through-bore defined therein and having a portion thereof disposed within said aperture of said automotive vehicle inner door panel so as to be mounted upon said automotive vehicle inner door panel;

said automotive vehicle window channel member having a shaft portion thereof disposed within said threaded through-bore of said nut member; and a tubular threaded screw member, having a bore defined therein for permitting said tubular threaded screw member to be surroundingly disposed about said shaft portion of said automotive vehicle window channel member, disposed within said threaded through-bore of said nut member for threadedly engaging said threaded through-bore of said nut member so as to fixedly grasp and retain said shaft portion of said automotive vehicle window channel member at said desired position with respect to said automotive vehicle inner door panel, depending upon the extent to which said shaft portion of said automotive vehicle window channel member is inserted into said through-bore of said nut member, when said tubular threaded screw member is threadedly engaged with said nut member.

\* \* \* \* \*